(12) United States Patent
Huang

(10) Patent No.: US 11,785,075 B2
(45) Date of Patent: Oct. 10, 2023

(54) METHOD FOR REQUESTING RESOURCES AND TERMINAL

(71) Applicant: Wangsu Science & Technology Co., Ltd., Shanghai (CN)

(72) Inventor: Youming Huang, Shanghai (CN)

(73) Assignee: Wangsu Science & Technology Co., Ltd., Shanghai (CN)

( * ) Notice: Subject to any disclaimer, the term of this patent is extended or adjusted under 35 U.S.C. 154(b) by 0 days.

(21) Appl. No.: 17/656,808

(22) Filed: Mar. 28, 2022

(65) Prior Publication Data

US 2022/0272145 A1    Aug. 25, 2022

Related U.S. Application Data

(63) Continuation of application No. PCT/CN2021/098480, filed on Jun. 4, 2021.

(30) Foreign Application Priority Data

Feb. 20, 2021 (CN) .......................... 202110193382.4

(51) Int. Cl.
*H04L 67/10* (2022.01)

(52) U.S. Cl.
CPC .................. *H04L 67/10* (2013.01)

(58) Field of Classification Search
CPC ..... H04L 67/10; H04L 67/1008; H04L 65/80; H04L 47/74; H04L 47/76
USPC ........................................................ 709/226
See application file for complete search history.

(56) References Cited

U.S. PATENT DOCUMENTS

| 7,774,468 B1* | 8/2010 | Nag ..................... H04L 65/1043 709/224 |
| 2008/0098123 A1 | 4/2008 | Huang et al. |
| 2015/0263916 A1* | 9/2015 | Phillips ................. H04L 65/752 709/224 |
| 2015/0326868 A1* | 11/2015 | Ezhov .............. H04N 21/64761 709/219 |
| 2017/0149871 A1 | 5/2017 | Lahr et al. |
| 2020/0045588 A1* | 2/2020 | Zhang ................... H04W 28/26 |
| 2020/0186588 A1 | 6/2020 | Xu |
| 2021/0400107 A1* | 12/2021 | Dai ..................... H04L 67/1063 |

FOREIGN PATENT DOCUMENTS

| CN | 102307218 A | 1/2012 |
| CN | 102547395 A | 7/2012 |
| CN | 103618801 A * | 3/2014 |

(Continued)

OTHER PUBLICATIONS

Machine translation of CN-108566370-A (Year: 2018).*

(Continued)

*Primary Examiner* — Ruolei Zong
(74) *Attorney, Agent, or Firm* — HESLIN ROTHENBERG FARLEY AND MESITI PC; Nicholas Mesiti

(57) ABSTRACT

The present disclosure provides a method for requesting resources and a terminal. The terminal sends a first resource acquisition request for a target resource to each of first edge nodes, determines each of second edge nodes based on each first amount of the target resource returned by each of the first edge nodes, and sends a second resource acquisition request for the target resource to each of the second edge nodes.

16 Claims, 2 Drawing Sheets

(56) References Cited

FOREIGN PATENT DOCUMENTS

| | | | | | |
|---|---|---|---|---|---|
| CN | 106790689 | A | | 5/2017 | |
| CN | 108259542 | A | | 7/2018 | |
| CN | 108415775 | A | | 8/2018 | |
| CN | 108566370 | A | * | 9/2018 | ........... H04L 65/601 |
| CN | 108848530 | A | | 11/2018 | |
| CN | 109298949 | A | | 2/2019 | |
| CN | 109347968 | A | * | 2/2019 | ............. H04L 67/02 |
| CN | 109347968 | A | | 2/2019 | |
| CN | 109831335 | A | * | 5/2019 | |
| CN | 109889569 | A | | 6/2019 | |
| CN | 110099134 | A | * | 8/2019 | ............. H04L 67/06 |
| CN | 110213327 | A | | 9/2019 | |
| CN | 110300184 | A | * | 10/2019 | ......... H04L 67/1004 |
| CN | 110392094 | A | | 10/2019 | |
| CN | 111262906 | A | * | 6/2020 | ......... H04L 67/1012 |
| EP | 2015542 | A1 | | 1/2009 | |
| EP | 2088731 | A1 | | 8/2009 | |
| WO | WO-2018184491 | A1 | * | 10/2018 | ............. H04L 29/08 |

OTHER PUBLICATIONS

Machine translation of CN-109347968-A (Year: 2019).*
Wangsu Science & Technology Co., Ltd., Extended European Search Report, EP21867920.7, dated Sep. 30, 2022, 7 pgs.
Wangsu Science & Technology Co., Ltd., International Search Report with English Translation, PCT/CN2021/098480, dated Nov. 22, 2021, 6 pgs.
Wangsu Science & Technology Co., Ltd., CN First Office Action with English Translation, CN 202110193382.4, dated Dec. 1, 2021, 17pgs.
EP Application No. 21 867 920.7, Wangsu Science & Technology Co., Ltd., First Office Action, dated Jul. 10, 2023, 7 pages.

* cited by examiner

METHOD FOR REQUESTING RESOURCES AND TERMINAL

CROSS REFERENCE TO RELATED APPLICATIONS

The present disclosure is a continuation of PCT Patent Application No. PCT/CN2021/098480, entitled "METHOD FOR REQUESTING RESOURCES AND TERMINAL," filed Jun. 4, 2021, which claims priority to Chinese patent application No. 202110193382.4, entitled "METHOD FOR REQUESTING RESOURCES AND TERMINAL," filed Feb. 20, 2021, each of which is incorporated by reference herein in its entirety.

TECHNIC FIELD

The embodiments of the present disclosure relate in general to streaming media on demand technology, and more specifically to a method for requesting resources and a terminal.

BACKGROUND

In a current video on demand system, a peer to server & peer (P2SP) system are generally used in order to achieve a video playback effect with low cost. In this system, a part of media resources requested by a client are downloaded from a content delivery network (CDN) node, and another part of the media resources are downloaded from an edge node located in a peer to peer (P2P) network, as described in the following operations.

Firstly, when the client receives a playback request from a user for a video stream, the client divides the entire video stream into several small slices, and subsequent download tasks are all based on the small slices as the minimum units for scheduling and allocating the data download.

Secondly, in order to avoid the delay in first screen playing of video streams, each video stream first requests a certain data amount of the small slices from the CDN node in a starting stage.

Then, a P2P download task is started after the video stream cached by the client reaches a certain data amount. One video stream is deployed on a plurality of edge nodes due to the stability and transmission rate of the edge node being lower than those of the CDN node. The P2P download task is configured to indicate that the client requests data segments of different slices from different edge nodes at the same time to increase a download rate of concurrent data.

Moreover, the entire download task has a CDN sliding window, and CDN slice-supplementary is performed when a P2P data download rate is less than an advance speed of the CDN sliding window.

In the above process, the client divides the video stream into a plurality of small slices with small granularities, so the data requested by the client from each edge node storing this video stream is discontinuous when the client executes the P2P download task. As a result, the edge nodes are prone to bottlenecks in I/O performance and better services are unable to be provided.

In conclusion, an efficient method for data downloading is urgently desired.

SUMMARY

The present disclosure provides a method for requesting resources and a terminal, which solve a technical problem that edge nodes are easily prone to bottlenecks in I/O performance when a video stream is downloaded using a P2SP system.

Embodiments of the present disclosure provide a method for requesting resources, including: applied at a terminal, comprising: sending a first resource acquisition request for a target resource to each of first edge nodes; determining each of second edge nodes based on each first amount of the target resource returned by each of the first edge nodes, wherein the second edge nodes are included in the first edge nodes; and sending a second resource acquisition request for the target resource to each of the second edge nodes.

Based on this, in a video on demand scenario, the terminal sends the first resource acquisition request for the target resource to each of the first edge nodes, determines each of the second edge nodes based on each first amount of the target resource returned by each of the first edge nodes, and then sends the second resource acquisition request for the target resource to each of the second edge nodes such that the terminal does not need to send the resource acquisition request to each of the first edge nodes again. In this way, the number of the first edge nodes used by the terminal is effectively reduced. Moreover, the terminal is able to request data centrally from some high-quality edge nodes, and each of the high-quality edge nodes returns a large amount of the target resource to the terminal, which avoids continuing to request data from some edge nodes not serving well, thereby overcoming the technical problem that edge nodes are easily prone to bottlenecks in I/O performance, and improving data pre-reading performance of the edge nodes.

In some embodiments, determining each of the second edge nodes based on each first amount of the target resource returned by each of the first edge nodes includes: for any first edge node of the first edge nodes, determining a transmission rate of the first edge node according to a first amount of the target resource returned by the first edge node; and in response to determining that a total amount of the target resource cached by the terminal meets a first setting condition, determining each of the second edge nodes according to each transmission rate of each of the first edge nodes.

Based on this, when the terminal determines each of the second edge nodes from each of the first edge nodes, for any first edge node, the terminal first determines the transmission rate of this first edge node according to the first amount of the target resource returned by this first edge node to the terminal. Then, in response to determining that the total amount of the target resource cached by the terminal meets the first setting condition (the first setting condition indicating that the total amount meets the minimum requirement for cache play), the terminal determines each of the second edge nodes according to the transmission rate of each first edge node. In this way, the terminal is able to flexibly determine edge nodes currently required.

In some embodiments, after sending the second resource acquisition request for the target resource to each of the second edge nodes, the method further includes: in response to determining, based on each second amount of the target resource returned by each of the second edge nodes, that a total amount of the target resource cached by the terminal meets a second setting condition, stopping sending a resource acquisition request to any edge node.

Based on this, after the terminal determines each of the second edge nodes from each of the first edge nodes and sends the second resource acquisition request to each of the second edge nodes, each of the second edge nodes returns the target resource of each respective second amount (any two second amounts may be the same, or may be different)

to the terminal. Thus, in response to determining that the total amount of the target resource cached by the terminal meets the second setting condition (the second setting condition indicating that the total amount meets the highest requirement for cache play, the terminal is able to temporarily stop sending the resource acquisition request to edge nodes that store the target resource. In this way, the terminal is able to determine that the total amount of the target resource cached by the terminal meets users' requirements for smooth play, and is also able to effectively ensure that the total amount of the target resource cached by the terminal is not too much, so that the resource loss caused by the user stopping viewing the target resource is controlled within a reasonable range.

In some embodiments, before sending the first resource acquisition request for the target resource to each of the first edge nodes, the method further includes: receiving a resource play instruction triggered by a user, wherein the resource play instruction is configured to instruct the terminal to play the target resource; sending a third resource acquisition request for the target resource to a content delivery network, CDN, node; and receiving the target resource of a third amount returned by the CDN node, wherein the third amount is configured to identify that the total amount of the target source cached by the terminal meets the first setting condition.

Based on this, in the video on demand scenario, the terminal acquires, through a server, information about the CDN node and edge nodes storing the target resource after receiving a resource playing instruction triggered by the user for playing the target resource, so that the terminal acquires the target resource from corresponding CDN node and edge nodes to implement the playing. Furthermore, in first screen playing of the target resource, the terminal sends the third resource acquisition request for the target resource to the CDN node in order to meet the users' requirements for the smooth play, so that the resource of the third amount returned by the CDN node to the terminal is able to realize that the total amount of the target resource cached by the terminal itself meets the first setting condition.

In some embodiments, after sending the third resource acquisition request for the target resource to the CDN node, the method further includes: sending a fourth resource acquisition request to each of edge nodes that store the target resource after determining that the total amount of the target resource cached by the terminal meets the first setting condition, wherein the fourth resource acquisition request is configured to instruct each of the edge nodes to return the target source of the same fourth amount to the terminal.

Based on this, when the target resource of the third amount received by the terminal from the CDN node is able to realize that the total amount of the target resource cached by the terminal meets the first setting condition, the terminal sends the fourth resource acquisition request to each edge node storing the target resource in the environment. The fourth resource acquisition request is configured to instruct each edge node to return the target resource of the same fourth amount to the terminal, and the same fourth amount is a minimum unit of the target resource. In this way, the terminal is able to quickly determine, from each edge node, which edge nodes need to be used in one resource return period, thereby overcoming the technical problem that the edge nodes are easily prone to bottlenecks in I/O performance, and improving data pre-reading performance of the edge nodes.

In some embodiments, determining each of the second edge nodes based on each first amount of the target resource returned by each of the first edge nodes includes: determining each of the second edge nodes and each second amount of the target resource returned by each of the second edge nodes based on each first amount of the target resource returned by each of the first edge nodes, wherein each second amount of the target resource returned by each of the second edge nodes is not completely the same.

Based on this, when the terminal receives the target resource of the first amount returned by each of the first edge nodes and determines that the total amount of the target resource cached by the terminal in a next resource return period meets the first setting condition, the terminal is able to determine which edge nodes of the first edge nodes are required to be used in the next resource return period based on state data of the target resource returned by each of the first edge nodes this time, i.e., determine each second edge node. At the same time, the terminal is also able to determine the second amount of the target resource returned by each second edge node to the terminal, where different second edge nodes may have the same or different second return amounts.

In some embodiments, the terminal establishes a heartbeat mechanism with at least one third edge node, wherein the heartbeat mechanism is configured for the terminal to determine a service state of each of the at least one third edge node, and the least one third edge node is at least one edge node other than the second edge nodes among the first edge nodes.

Based on this, in order to prevent one or some of the second edge nodes from fluctuating or becoming unavailable in the process in which the terminal uses the second edge nodes to return the target resource to itself, the terminal uses at least one edge node other than the second edge nodes among the first edge nodes to provide a resource download service for itself, i.e., the terminal controls the at least one third edge node to return the target resource to itself. In this method, in order to enable the at least one third edge node to efficiently provide the resource download service to the terminal, the heartbeat mechanism is established between the terminal and the at least one third edge node to ensure the at least one third edge node to be always in a serviceable state.

In some embodiments, after sending the second resource acquisition request for the target resource to each of the second edge nodes, the method further includes: in response to determining that there is a second edge node in an unserviceable state, determining an edge node for replacing the second edge node in the unserviceable state according to each transmission rate of each of the at least one third edge node.

Based on this, in response to determining that one or some of the second edge nodes unable to provide the data download service exists in the second edge nodes, the terminal determines the edge node(s) (i.e., replacement edge node) able to be used to replace this/some of the second edge nodes unable to serve from the at least one third edge node. The terminal determines which edge nodes the replacement edge nodes may be respectively through the transmission rate of the at least one third edge node, so that the terminal is able to always provide the user with the target resource able to be played smoothly.

In some embodiments, determining each of the second edge nodes according to each transmission rate of each of the first edge nodes includes: for any first edge node of the first edge nodes, determining a second amount of the target resource returned by the first edge node according to a transmission rate of the first edge node in a latest resource return period; determining N first edge nodes from the first edge nodes, wherein a total amount of the target resource of each second amount returned by each of the N first edge nodes is configured to achieve that the total amount of the target resource cached by the terminal meets the second setting condition; and taking the N first edge nodes as the second edge nodes, wherein N is a positive integer greater than 1.

Based on this, the terminal determines the second edge node according to the transmission rate of the first edge node when determining each second edge node from each of the first edge nodes, which further includes the following operations. For any first edge node among the first edge nodes, the terminal determines, according to the transmission rate of this first edge node in the latest resource return period, the data amount of the target resource returned by this first edge node to the terminal in the next resource return period (i.e., a current resource return period), i.e., determines the second amount), so that the terminal selects N first edge nodes from the first edge nodes, and takes the N second edge nodes as the second edge nodes since the total data amount of the resource returned by the N first edge nodes to the terminal in the next resource return period is able to be used to realize that the total amount of the resource cached by the terminal meets the second setting condition. This method is flexible in determining the edge nodes currently required.

In some embodiments, a number of the first edge nodes is M, and determining the N first edge nodes from the first edge nodes includes: sorting transmission rates of M first edge nodes in descending order, wherein M is a positive integer greater than N; and in response to determining that a total amount of the target resource of each second amount returned by each of first N first edge nodes is configured to achieve that the total amount of the target resource cached by the terminal meets the second setting condition, and that a total amount of the target resource of each second amount returned by each of first N−1 first edge nodes is unable to be configured to achieve that the total amount of the target resource cached by the terminal meets the second setting condition, taking the N first edge nodes as the second edge nodes.

Based on this, in the process in which the terminal determines the second edge nodes from the M first edge nodes, some edge nodes having higher transmission rates may be preferentially selected so that the edge nodes having higher transmission rates return the target resource to the terminal in the next resource return period. In this process, the transmission rates of the M first edge nodes are sorted in descending order. In response to determining that the total amount of the target resource of each second amount returned by each of first N−1 first edge nodes is unable to be configured to achieve that the total amount of the target resource cached by the terminal meets the second setting condition, but the total amount of the target resource of each second amount returned by each of first N first edge nodes is able to exactly achieves that the total amount of the target resource cached by the terminal meets the second setting condition, taking the N first edge nodes as the second edge nodes. In this way, the terminal is able to centrally request target resources from several high-quality edge nodes without requesting data from all edge nodes storing the target resources and existing in the environment.

Embodiments of the present disclosure provide a terminal including: a resource acquisition request sending unit, configured to send a first resource acquisition request for a target resource to each of first edge nodes; and a determining unit, configured to determine each of second edge nodes based on each first amount of the target resource returned by each of the first edge nodes; wherein the resource acquisition request sending unit is further configured to send a second resource acquisition request for the target resource to each of the second edge nodes.

Based on this, in a video on demand scenario, the terminal sends the first resource acquisition request for the target resource to each of the first edge nodes, determines each of the second edge nodes based on each first amount of the target resource returned by each of the first edge nodes, and then sends the second resource acquisition request for the target resource to each of the second edge nodes such that the terminal does not need to send the resource acquisition request to each of the first edge nodes again. In this way, the number of the first edge nodes used by the terminal is effectively reduced. Moreover, the terminal is able to request data centrally from some high-quality edge nodes, and each of the high-quality edge nodes returns a large amount of the target resource to the terminal, which avoids continuing to request data from some edge nodes not serving well, thereby overcoming the technical problem that edge nodes are easily prone to bottlenecks in I/O performance, and improving data pre-reading performance of the edge nodes.

In some embodiments, the determining unit is further configured to: for any first edge node of the first edge nodes, determine a transmission rate of the first edge node according to a first amount of the target resource returned by the first edge node; and in response to determining that a total amount of the target resource cached by the terminal meets a first setting condition, determine each of the second edge nodes according to each transmission rate of each of the first edge nodes.

Based on this, when the terminal determines each of the second edge nodes from each of the first edge nodes, for any first edge node, the terminal first determines the transmission rate of this first edge node according to the first amount of the target resource returned by this first edge node to the terminal. Then, in response to determining that the total amount of the target resource cached by the terminal meets the first setting condition (the first setting condition indicating that the total amount meets a minimum requirement for cache play), the terminal determines each of the second edge nodes according to the transmission rate of each first edge node. In this way, the terminal is able to flexibly determine edge nodes currently required.

In some embodiments, the resource acquisition request sending unit is further configured to stop sending the resource acquisition request to the edge node in response to determining, based on each second amount of the target resource returned by each of the second edge nodes, that a total amount of the target resource cached by the terminal meets a second setting condition.

Based on this, after the terminal determines each of the second edge nodes from each of the first edge nodes and sends the second resource acquisition request to each of the second edge nodes, each of the second edge nodes returns each respective second amount of the target resource (any two second amounts may be the same, or may be different) to the terminal. Thus, in response to determining that the total amount of the target resource cached by the terminal meets the second setting condition (the second setting condition indicating that the total amount meets the highest requirement for cache play, the terminal is able to temporarily stop sending the resource acquisition request to edge nodes that store the target resource. In this way, the terminal is able to determine that the total amount of the target resource cached by the terminal meets users' requirements for smooth play, and is also able to effectively ensure that the total amount of the target resource cached by the terminal is not too much, so that the resource loss caused by the user stopping viewing the target resource is controlled within a reasonable range.

In some embodiments, the resource acquisition request sending unit is further configured to: receive a resource play instruction triggered by a user, wherein the resource play instruction is configured to instruct the terminal to play the target resource; send a third resource acquisition request for the target resource to a content delivery network, CDN, node; and receive the target resource of a third amount returned by the CDN node, wherein the third amount is configured to identify that the total amount of the target source cached by the terminal meets the first setting condition.

Based on this, in the video on demand scenario, the terminal acquires, through a server, information about the CDN node and edge nodes storing the target resource after receiving a resource playing instruction triggered by the user for playing the target resource, so that the terminal acquires the target resource from corresponding CDN node and edge nodes to implement the playing. Furthermore, in first screen playing of the target resource, the terminal sends the third resource acquisition request for the target resource to the CDN node in order to meet the users' requirements for the smooth play, so that the resource of the third amount returned by the CDN node to the terminal is able to be used to realize that the total amount of the target resource cached by the terminal itself meets the first setting condition.

In some embodiments, the resource acquisition request sending unit is further configured to send a fourth resource acquisition request to each of edge nodes that store the target resource after determining that the total amount of the target resource cached by the terminal meets the first setting condition, wherein the fourth resource acquisition request is configured to indicate that each of the edge nodes returns the target source of the same fourth amount to the terminal.

Based on this, when the target resource of the third amount received by the terminal from the CDN node is able to realize that the total amount of the target resource cached by the terminal meets the first setting condition, the terminal sends the fourth resource acquisition request to each edge node storing the target resource in the environment. The fourth resource acquisition request is configured to instruct each edge node to return the target resource of the same fourth amount to the terminal, and the same fourth amount is a minimum unit of the target resource. In this way, the terminal is able to quickly determine, from each edge node, which edge nodes need to be used in one resource return period, thereby overcoming the technical problem that the edge nodes are easily prone to bottlenecks in I/O performance, and improving data pre-reading performance of the edge nodes.

In some embodiments, the determining unit is further configured to determine each of the second edge nodes and each second amount of the target resource returned by each of the second edge nodes based on each first amount of the target resource returned by each of the first edge nodes, wherein each second amount of the target resource returned by each of the second edge nodes is not completely the same.

Based on this, when the terminal receives the target resource of the first amount returned by each of the first edge nodes and determines that the total amount of the target resource cached by the terminal in a next resource return period meets the first setting condition, the terminal is able to determine which edge nodes of the first edge nodes are required to be used in the next resource return period based on state data of the target resource returned by each of the first edge nodes this time, i.e., determine each second edge node. At the same time, the terminal is also able to determine the second amount of the target resource returned by each second edge node to the terminal, where different second edge nodes may have the same or different second return amounts.

In some embodiments, the terminal further includes an edge node keep-alive unit, wherein the edge node keep-alive unit is configured to establish a heartbeat mechanism with at least one third edge node, wherein the heartbeat mechanism is configured for the terminal to determine a service state of each of the at least one third edge node, and the least one third edge node is at least one edge node other than the second edge nodes among the first edge nodes.

Based on this, in order to prevent one or some of the second edge nodes from fluctuating or becoming unavailable in the process in which the terminal uses the second edge nodes to return the target resource to itself, the terminal uses at least one edge node other than the second edge nodes among the first edge nodes to provide a resource download service for itself, i.e., the terminal controls the at least one third edge node to return the target resource to itself. In this method, in order to enable the at least one third edge node to efficiently provide the resource download service to the terminal, the heartbeat mechanism is established between the terminal and the at least one third edge node to ensure the at least one third edge node to be always in a serviceable state.

In some embodiments, the resource acquisition request sending unit is further configured to: in response to determining that there is a second edge node in an unserviceable state, determine an edge node for replacing the second edge node in the unserviceable state according to each transmission rate of each of the at least one third edge node.

Based on this, in response to determining that one or some of the second edge nodes unable to provide the data download service exists in the second edge nodes, the terminal determines the edge node(s) (i.e., replacement edge node) able to be used to replace this/some of the second edge nodes unable to serve from the at least one third edge node. The terminal determines which edge nodes the replacement edge nodes may be respectively through the transmission rate of the at least one third edge node, so that the terminal is able to always provide the user with the target resource able to be played smoothly.

In some embodiments, the determining unit is further configured to: for any first edge node of the first edge nodes, determine a second amount of the target resource returned by the first edge node according to a transmission rate of the first edge node in a latest resource return period; determine N first edge nodes from the first edge nodes, wherein a total amount of the target resource of each second amount returned by each of the N first edge nodes is configured to achieve that the total amount of the target resource cached by the terminal meets the second setting condition; and take the N first edge nodes as the second edge nodes.

Based on this, the terminal determines the second edge node according to the transmission rate of the first edge node when determining each second edge node from each of the first edge nodes, which further includes the following operations. For any first edge node among the first edge nodes, the terminal determines, according to the transmission rate of this first edge node in the latest resource return period, the data amount of the target resource returned by this first edge node to the terminal in the next resource return period (i.e., a current resource return period), i.e., determines the second amount), so that the terminal selects N first edge nodes from the first edge nodes, and takes the N second edge nodes as the second edge nodes since the total data amount of the resource returned by the N first edge nodes to the terminal in the next resource return period is able to achieve that the total amount of the resource cached by the terminal meets the second setting condition. This method is flexible in determining the edge nodes currently required.

In some embodiments, a number of the first edge nodes is M, and the determining unit is further configured to: sort transmission rates of M first edge nodes in descending order; and in response to determining that a total amount of the target resource of each second amount returned by each of first N first edge nodes is configured to achieve that the total amount of the target resource cached by the terminal meets the second setting condition, and that a total amount of the target resource of each second amount returned by each of first N−1 first edge nodes is unable to be configured to achieve that the total amount of the target resource cached by the terminal meets the second setting condition, take the N first edge nodes as the second edge nodes.

Based on this, in the process in which the terminal determines the second edge nodes from the M first edge nodes, some edge nodes having higher transmission rates may be preferentially selected so that the edge nodes having higher transmission rates return the target resource to the terminal in the next resource return period. In this process, the transmission rates of the M first edge nodes are sorted in descending order. In response to determining that the total amount of the target resource of each second amount returned by each of first N−1 first edge nodes is unable to be configured to achieve that the total amount of the target resource cached by the terminal meets the second setting condition, but the total amount of the target resource of each second amount returned by each of first N first edge nodes is able to exactly achieves that the total amount of the target resource cached by the terminal meets the second setting condition, taking the N first edge nodes as the second edge nodes. In this way, the terminal is able to centrally request target resources from several high-quality edge nodes without requesting data from all edge nodes storing the target resources and existing in the environment.

Embodiments of the present disclosure provide a computer device including: a memory configured to store computer programs; and at least one processor configured to invoke the computer programs stored in the memory to execute the method for requesting resources.

Embodiments of the present disclosure provide a computer readable storage medium storing a program that, when executed on a computer, causes the computer to perform the method requesting resources.

BRIEF DESCRIPTION OF THE DRAWINGS

In order to illustrate the technical solutions in the embodiments of the present disclosure more clearly, the accompanying drawings used in the description of the embodiments are briefly described below. It is apparent that the drawings in the following description are only some embodiments of the present disclosure. For those of ordinary skills in the art, other drawings may also be obtained according to these drawings without any creative effort.

DETAILED DESCRIPTION OF THE EMBODIMENTS

In order to make the objectives, technical solutions and advantages of the present disclosure clearer, embodiments of the present disclosure are described in details with reference to the accompanying drawings. It is apparent that the described embodiments are only a part of but not all of the embodiments of the present disclosure. Based on the embodiments of the present disclosure, all other embodiments obtained by those of ordinary skills in the art without any creative effort shall fall within the scope of the protection of the present disclosure.

Figure 1:
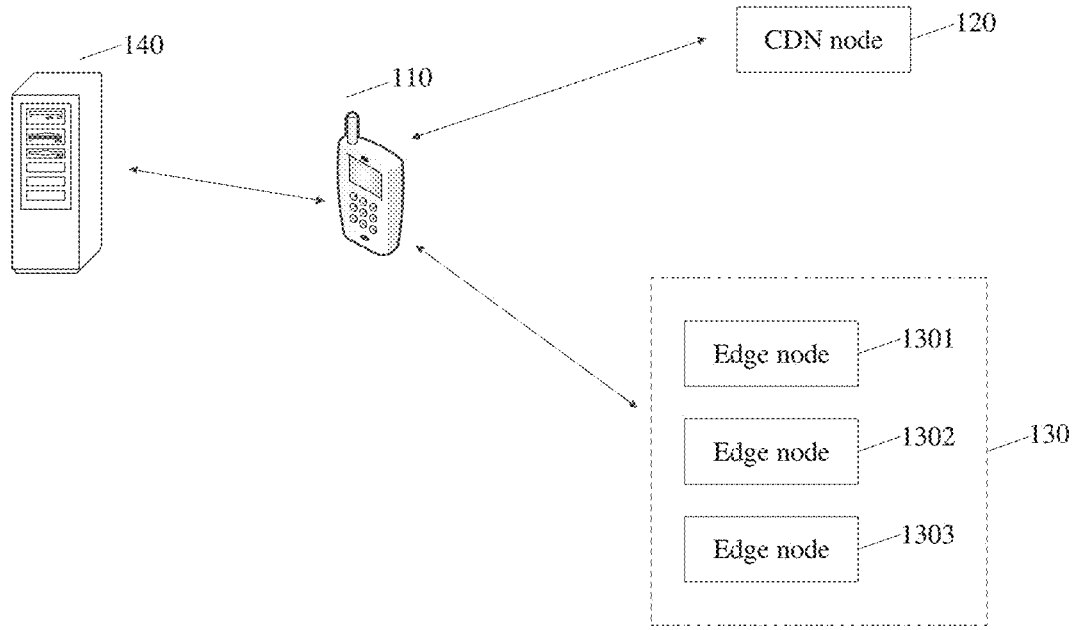
FIG. 1 is a schematic diagram of a possible system architecture in accordance with some embodiments of the present disclosure.

As shown in FIG. 1, a possible system architecture according to some embodiments of the present disclosure includes a terminal 110, at least one CDN node 120 (schematically illustrated by one CDN node in FIG. 1), and at least one edge node 130 (e.g., an edge node 1301, an edge node 1302, and an edge node 1303 shown in FIG. 1). In one embodiment, the system architecture further includes a server 140.

The terminal 110 may be an intelligent device such as a smartphone, a computer, a television, or the like. The terminal 110 may be installed with video players. When a user wants to watch a video resource in a video player in the terminal 110, the user clicks an icon corresponding to the video resource such that the terminal 110 receives a resource play instruction triggered by the user. When the terminal 110 receives the resource play instruction triggered by the user, the terminal 110 sends a serviceable node determination request to the server 140. The serviceable node determination request includes a resource identifier of a video resource that the user wants to watch this time, so that the server 140 returns information of serviceable nodes to the terminal 110. The information of serviceable nodes is configured to indicate information of CDN nodes and edge nodes that are able to provide video resource downloading services to the terminal 110 this time. In other words, the information of serviceable nodes is configured to inform the terminal 110 of which CDN node(s) and which edge nodes the terminal is able to send a video resource acquisition request to this time, that is, all the CDN nodes and edge nodes included in the information of serviceable nodes store the video resource that the user wants to watch this time, and the edge nodes are located in a P2P network.

The server 140 is configured to receive the serviceable node determination request sent by the terminal 110, determine, after receiving the serviceable node determination request, the CDN nodes and edge nodes that are able to serve the terminal 110 this time based on the resource identifier included in the serviceable node determination request, and return the information of serviceable nodes to the terminal 110 after determining information of serviceable CDN nodes and serviceable edge nodes.

After receiving the information of serviceable nodes returned by the server 140, the terminal 110 is further configured to send a resource acquisition request for a video resource for first screen playing to the CDN node 120 based on the information of the CDN nodes (e.g., including the CDN node 120) in the information of serviceable nodes. In this process, since the CDN node has characteristics of large bandwidth and stable performance compared with the edge node, the terminal sends the resource acquisition request to the CDN node instead of the edge node in the process of playing the video resource, in order to enable a total amount of the video resource cached by the terminal 110 to meet the user's requirement for smooth play.

Before sending the resource acquisition request for the video resource for the first screen playing to the CDN node, the terminal 110 is further configured to divide the video resource that the user wants to watch this time, e.g., uniformly divide the video resource into P resource slices in the order of time, and mark a unique slice identifier for each of the P resource slices, so that the terminal 110 is able to subsequently control the CDN nodes or the edge nodes to return the specified video resource to the terminal 110 according to the slice identifier generated by the division.

It should be noted that the operation of the terminal 110 dividing the video resource that the user wants to watch this time belongs to a pre-operation, which does not actually occur.

Therefore, the terminal 110 sends the resource acquisition request for the video resource for the first screen playing to the CDN node 120, and the data amount of the video resource requested in the resource acquisition request is able to meet the user's requirement for smooth play. The resource acquisition request may include Q resource slices (Q is less than P), and the Q resource slices are the first Q of the P resource slices.

The CDN node 120 transmits the Q resource slices that are locally stored to the terminal 110 when receiving the resource acquisition request sent by the terminal 110 for the video resource for the first screen playing.

When receiving the Q resource slices returned by the CDN node 120, the terminal 110 is further configured to first parse the Q resource slices to obtain an average code rate corresponding to the video resource that the user wants to watch this time, e.g., setting the average code rate as B (in Kbps) for identification. Then, on the one hand, the terminal 110 is able to display to the user the video resource that the user wants to watch, i.e., turn on the first screen playing; on the other hand, the total amount of the video resource cached by the terminal 110 itself has met the requirement for smooth first screen playing, and in order to reduce service pressure of the CDN nodes, the terminal 110 is able to send, based on the information of the edge nodes in the received information of serviceable nodes, resource acquisition requests of the same size to these edge nodes (all or part of the edge nodes) respectively to enable these edge nodes to provide the service for the terminal 110, i.e., to return subsequent video resources the terminal 110. The resource acquisition requests of the same size indicates that the terminal 110 sends a resource acquisition request of the same size but with a different slice identifier to each of the edge nodes. In this manner, the concurrent capability when the edge nodes return the video resource to the terminal 110 is improved such that the terminal 110 is able to receive more subsequent video resources in a short time.

It should be noted that, when parsing the average code rate B, the terminal 110 is not necessarily required to perform the parsing after all the Q resource slices are received. In some embodiments of the present disclosure, since the average code rate B may be edited in the first several Kb of a file corresponding to the video resource, the terminal 110 is able to acquire the average code rate B when not all the Q resource slices are received.

Furthermore, in this case, since it is the first time that the terminal 110 requests the resource from the edge node, that is, the terminal 110 is unable to acquire the transmission rate of each edge node in the information of serviceable nodes, the terminal 110 sends the resource acquisition requests of the same size to each edge node respectively at the same time in order to quickly acquire the transmission rate of each edge node. The same size is only a scale of a data amount of one resource slice.

The edge node 130 is configured to transmit the resource slices required to be returned in the resource acquisition request to the terminal 110 based on the resource acquisition request sent by the terminal 110, using locally pre-stored video resources that the user wants to watch this time. With respect to a process in which the terminal 110 sends the resource acquisition request to a plurality of edge nodes respectively at the same time, i.e., in the same resource return period, different edge nodes return different resource slices (indicating different resource contents) to the terminal 110, but the number of the resource slices may be the same or different, and the number of the resource slices is determined by the terminal 110 according to the transmission rate of each edge node.

In a scenario, i.e., the terminal 110 separately sends the resource acquisition requests of the same size to each of the edge nodes in the same resource return period, the terminal 110 is further configured to determine, according to the transmission rate at which each edge node transmits the resources of the same size to the terminal 110, which edge nodes among the edge nodes the terminal 110 may send a new round of resource acquisition requests to in the next resource return period to obtain subsequent video resources. In the new round of resource acquisition requests, the number of resource slices transmitted to the terminal 110 by each of the edge nodes selected by the terminal 110 may be the same or different. The number of resource slices is determined by the terminal 110 according to each respective amount of the resource returned by each of the selected edge nodes in the previous resource return period, or is further determined according to the transmission rate of each of the selected edge nodes. In this process, the total data amount of the resource returned by the edge nodes selected by the terminal 110 to the terminal 110 needs to be controlled to meet a certain preset condition, i.e., the total amount of the video resource cached by the terminal 110 needs to be controlled to meet a preset highest requirement for cache play. The highest requirement for cache play is the maximum amount of the video resource that the user is able to watch under a condition of smooth play, and the highest requirement for cache play is determined by a technician according to actual experience, a purpose of which is to avoid that the user does not want to continue to watch the video and exits the video being played. If the edge nodes return too many video resources at this time (i.e., the total amount of video resources in a local cache of the terminal 110 is too large), it is easy to cause waste of network resources and occupation of memory resources of the terminal 110.

In another scenario, i.e., the terminal 110 separately sends resource acquisition requests that are not of the same size to each of the edge nodes in the same resource return period, the terminal 110 is further configured to determine each respective transmission rate of each edge node according to transmission duration when each edge node transmits the resource of the same size to the terminal 110, so as to determine which edge nodes among the edge nodes the terminal 110 may send a new round of resource acquisition requests to acquire subsequent video resources in the next resource return period. In the new round of resource acquisition requests, the number of resource slices transmitted to the terminal 110 by each of the edge nodes selected by the terminal 110 may be the same or different. The number of resource slices is determined by the terminal 110 according to each respective amount of the resource returned by each of the selected edge nodes in the previous resource return period, or is further determined according to the transmission rate of each of the selected edge nodes. In this process, the total data amount of the resource returned by the edge nodes selected by the terminal 110 to the terminal 110 needs to be controlled to meet a certain preset condition, i.e., the total amount of the video resource cached by the terminal 110 needs to be controlled to meet a preset highest requirement for cache play. The highest requirement for cache play is the maximum amount of the video resource that the user is able to watch under a condition of smooth play, and the highest requirement for cache play is determined by a technician according to actual experience, a purpose of which is to avoid that the user does not want to continue to watch the video and exits the video being played. If the edge nodes return too many video resources at this time (i.e., the total amount of video resources in a local cache of the terminal 110 is too large), it is easy to cause waste of network resources and occupation of memory resources of the terminal 110.

It should be noted that, the terminal 110 in the above example determines the number of resource slices that each edge node needs to return in the new round of resource acquisition requests according to each respective transmission rate of each respective edge node. The number of resource slices may be determined in the following modes.

In Mode 1, for a transmission rate, the number of resource slices corresponding to the transmission rate is preset. The greater the transmission rate, the larger the number of resource slices. If the transmission rate is 5 Kbps, it is determined that the number of resource slices is 2. If the transmission rate is 8 Kbps, it is determined that the number of resource slices is 3. If the transmission rate is 15 Kbps, it is determined that the number of resource slices is 4.

In Mode 2, for transmission rates in a certain range, any transmission rate in this range is preset to correspond to the same number of resource slices. The greater the transmission rate, the larger the number of resource slices. If the transmission rate is within a range of 0 to 5 Kbps, it is determined that the number of resource slices is 2. If the transmission rate is within a range of 10 to 15 Kbps, it is determined that the number of resource slices is 4.

Figure 2:
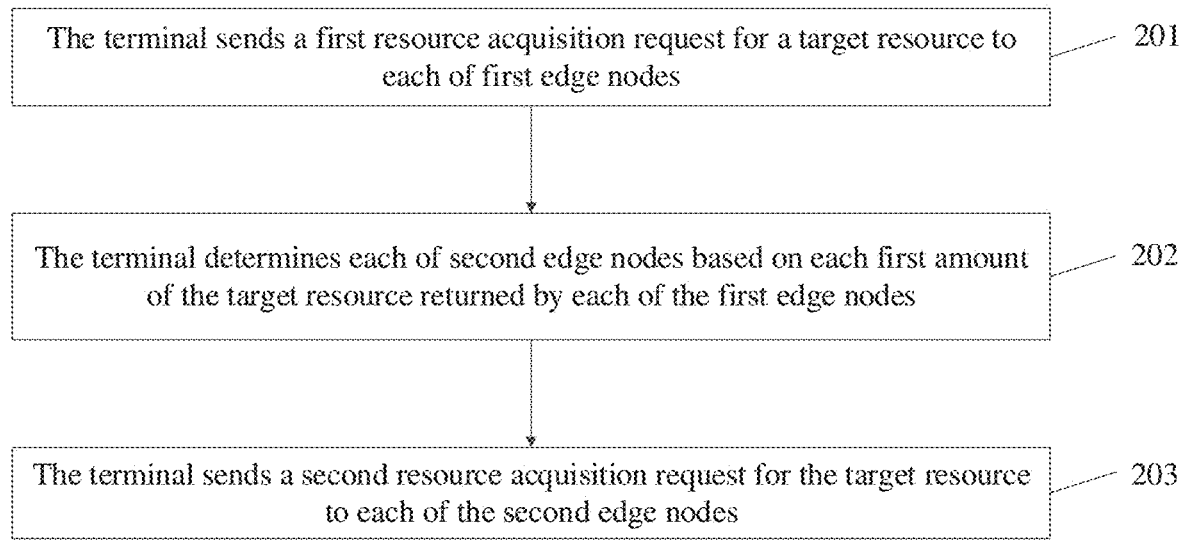
FIG. 2 illustrates a method for requesting resources in accordance with some embodiments of the present disclosure.

Based on the above technical system architecture, embodiments of the present disclosure provide a method for requesting resources executed by the terminal shown in FIG. 1. As shown in FIG. 2, the method includes the following operations.

In 201, the terminal sends a first resource acquisition request for a target resource to each of first edge nodes.

Each of the first edge nodes locally stores the target resource in advance. Each of the first edge nodes may be some or all of the first edge nodes stored with the target resource.

In one embodiment, before the terminal sends the first resource acquisition request for the target resource to each of the first edge nodes, the method further includes the following operations. The terminal receives a resource play instruction triggered by a user, sends a third resource acquisition request for the target resource to a content delivery network (CDN) node, and receives the target resource of a third amount returned by the CDN node. The resource play instruction is configured to instruct the terminal to play the target resource, and the third amount is configured to identify that the total amount of the target source cached by the terminal meets the first setting condition.

For example, in a video on demand scenario, if a user wants to watch a video resource currently, the user clicks an icon corresponding to the video resource in a video software of the terminal. The click operation of the user received by the terminal is configured to indicate that the terminal receives the resource play instruction, and the video resource is the target resource. In this case, on the one hand, the terminal may acquire information of the CDN nodes storing the video resource and information of the edge nodes storing the video resource from the server. On the other hand, the terminal may pre-divide the video resource to form individual resource slices, and data amounts of any two resource slices are the same, that is, the terminal specifies a minimum amount of data at which the CDN nodes and edge nodes subsequently return the video resources to the terminal. In other words, the terminal may divide the video resource into P equal portions according to a total data amount of the video resource and an order from a resource head to a resource tail (i.e., the order of time), each portion of the video resource is referred to as a resource slice, and each resource slice has its own unique slice identifier. Subsequently, the CDN nodes or edge nodes may return the video resource to the terminal at a data amount of a positive integer multiple (i.e., 1, 2, 3) of one resource slice. The number of resource slices returned by the CDN nodes or edge nodes to the terminal each time is determined by the terminal.

For example, a size of a video resource to be watched by the user is set as 600 M, and if the terminal performs an equal division operation on the video resource in a unit of 1M from the resource head to the resource tail, 600 resource slices are obtained. The obtained 600 resource slices are further named as a first slice, a second slice, a third slice, and a $600^{th}$ slice one by one in the order from the resource head to the resource tail. At the same time, the terminal sends a serviceable node determination request to the server, and sets the information of serviceable nodes returned by the server to include a CDN1 node, an edge node 1, an edge node 2, an edge node 3, an edge node 4, and an edge node 5. That is, the terminal is able to send the resource acquisition request to the CDN1 node, the edge node 1, the edge node 2, the edge node 3, the edge node 4, and the edge node 5 for the video resource to be watched by the user.

Because the service quality of the CDN node is generally higher than the service quality of any of the edge nodes, the terminal sends the resource acquisition request (i.e., a third resource acquisition request) to the CDN node at the first time in an initial playing phase of the video resource in order to quickly achieve the requirement for smooth playing of the video resource (i.e., the terminal determines that the total amount of the video resource cached by the terminal meets the first setting condition, where the first setting condition is the minimum requirement for cache play). The third resource acquisition request is configured to indicate that the total amount of the video resource cached by the terminal that is obtained by the data amount (i.e., a third amount) of the video resource returned by the CDN node to the terminal deducting the data amount of the video resource used by the terminal for real-time playing meets the first setting condition. For example, the terminal sends, to the CDN1 node, the resource acquisition request (i.e., the third resource acquisition request) for several consecutive resource slices starting from the resource header, e.g., the terminal sends a resource acquisition request for the first slice, the second slice, the third slice, and the $Q^{th}$ slice to the CDN1 node, i.e., the resource acquisition request for a total of Q resource slices, where Q is less than P. Furthermore, the terminal also parses an average code rate B of the current video resource from the first several resource slices (i.e., several resource slices starting from the resource header and before the $Q^{th}$ slice) returned by the CDN1 node.

In one embodiment, after the terminal sends the third resource acquisition request for the target resource to the CDN node, the method further includes the following operations. The terminal sends a fourth resource acquisition request to each of edge nodes that store the target resource after determining that the total amount of the target resource cached by the terminal meets the first setting condition. The fourth resource acquisition request is configured to instruct each of the edge nodes to return the target source of the same fourth amount to the terminal.

Following the above example in which the information of serviceable nodes includes the CDN1 node, the edge node 1, the edge node 2, the edge node 3, the edge node 4, and the edge node 5, for example, if the terminal determines that the video resource of the third amount returned by the CDN1 node to the terminal is able to achieve that the total amount of the video resource locally cached meets the first setting condition, the terminal is able to temporarily stop sending the resource acquisition request to the CDN1 node, but send the resource acquisition request to edge nodes storing the video resource, so that the operation pressure of the CDN1 node is relieved. In the process of the terminal sending the resource acquisition request to the edge nodes storing the video resource, in order to improve concurrent performance (i.e., the terminal is able to receive, after a resource acquisition request is sent once, a large amount of video resources returned by the edge nodes in a resource return period corresponding this resource acquisition request), the terminal sends the resource acquisition request to all edge nodes storing the video resource, e.g., the terminal simultaneously sends a resource acquisition request (i.e., a fourth resource acquisition request) to the edge node 1, the edge node 2, the edge node 3, the edge node 4, and the edge node 5, respectively. When the terminal sends the fourth resource acquisition request to each edge node storing the video resource, the terminal requests the video resource of the same amount from each edge node in order to quickly acquire the transmission rate of each edge node. The same amount is equal to one resource slice, and the contents of any two requested resource slices are different.

In 202, the terminal determines each of second edge nodes based on each first amount of the target resource returned by each of the first edge nodes.

When the terminal receives the target resource of the first amount returned by each first edge node to the terminal, the terminal determines, based on state data (including the data amount and transmission duration of the resource) of each first edge node when each first edge node returns the target resource of the first amount, which edge nodes the terminal may send the resource acquisition request to next time. The edge nodes determined by the terminal are the second edge nodes. In this way, the terminal is able to gradually request the target resource centrally from some high-quality edge nodes, so as to overcome the technical problem that edge nodes are easily prone to bottlenecks in I/O performance, and improving data pre-reading performance of the edge nodes.

In one embodiment, the terminal determining each of the second edge nodes based on each first amount of the target resource returned by each of the first edge nodes further includes the following operations. For any first edge node of the first edge nodes, the terminal determines a transmission rate of the first edge node according to a first amount of the target resource returned by the first edge node. In response to determining that a total amount of the target resource cached by the terminal meets a first setting condition, the terminal determines each of the second edge nodes according to each transmission rate of each of the first edge nodes.

The first setting condition in the embodiments of the present disclosure may be represented by a sliding window in units of time (e.g., in units of 's'), or may be represented by a sliding window in units of the data amount of the resource (e.g., in units of 'bit'), which is not specifically limited in the present disclosure. The first setting condition is configured to represent a minimum requirement for cache play. For example, in the above examples, the terminal needs to request the first slice, the second slice, the third slice, and the $Q^{th}$ slice (i.e., a resource of a total of Q resource slices) from the CDN1 node when the first screen playing is started. The sliding window in units of the data amount of the Q resource slices may be referred to as the first setting condition. In the embodiments of the present disclosure, the first setting condition is named as c1. Alternatively, the first setting condition indicated by the sliding window in units of time is determined by calculating the total data amount of the resource of the Q resource slices and the average code rate B.

Following the above example in which the information of serviceable nodes includes the CDN1 node, the edge node 1, the edge node 2, the edge node 3, the edge node 4, and the edge node 5, the following scenarios are described.

A possible scenario A is that the CDN1 node returns the $Q^{th}$ resource slice to the terminal at the time T1, and the terminal takes the edge node 1, the edge node 2, the edge node 3, the edge node 4, and the edge node 5 as each of the first edge nodes respectively based on the following two reasons.

Reason 1: in order to improve concurrent performance.

Reason 2: it is a time point that the terminal sends the resource acquisition request to the edge nodes storing the target resource for the first time, that is, it indicates that the terminal has not yet been able to acquire the service effect of each of the edge node 1, the edge node 2, the edge node 3, the edge node 4 and the edge node 5.

Therefore, based on the above two reasons, under the current resource acquisition request sending node, the terminal may respectively send a resource acquisition request to the edge node 1, the edge node 2, the edge node 3, the edge node 4, and the edge node 5. In this case, the resource acquisition request is the first resource acquisition request. Therefore, in the current resource return period, the terminal may determine the transmission rate of each first edge node according to the status data (the status data includes the data amount of the resource and the transmission duration consumed when the edge node returns the resource) when each first edge node (the edge node 1, the edge node 2, the edge node 3, the edge node 4, and the edge node 5) returns the resource specified in the first resource acquisition request. The total data amount of the resources indicated by the first resource acquisition request sent by the terminal to each first edge node shall be used to realize that the total cache amount of the target resource by the terminal meets the first setting condition.

It should be noted that the first resource acquisition request herein is equivalent to the fourth resource acquisition request in the above examples.

Therefore, in the current resource return period, the terminal acquires the respective transmission rates of each of the first edge nodes (i.e., the edge node 1, the edge node 2, the edge node 3, the edge node 4, and the edge node 5). The terminal determines, according to the transmission rate of each first edge node, which edge nodes to be used in the next resource return period may be from each of the first edge nodes. The edge nodes determined to be used are the second edge nodes.

In one embodiment, the terminal determining each of the second edge nodes based on each first amount of the target resource returned by each of the first edge nodes further includes the following operations. The terminal determines each of the second edge nodes and each second amount of the target resource returned by each of the second edge nodes based on each first amount of the target resource returned by each of the first edge nodes. Each second amount of the target resource returned by each of the second edge nodes is not completely the same.

For example, after the terminal acquires the respective transmission rates of each of the first edge nodes (i.e., the edge node 1, the edge node 2, the edge node 3, the edge node 4, and the edge node 5) in the above examples, the terminal determines, according to a preset correspondence between the transmission rate and the data amount of the resource, the size of the resource able to be returned by each of the first edge nodes to the terminal in the next resource return period. There is a positive correlation between the data amount of the resource and the transmission rate, i.e., the larger the transmission rate, the larger the data amount of the resource. In addition, the correspondence between the transmission rate and the data amount of the resource may be a one-to-one correspondence between the transmission rate and the data amount of the resource, or may be a plurality of transmission rates belonging to a certain range corresponding to the same data amount of the resource. The correspondence between the transmission rate and the data amount of the resource is not specifically limited in the present disclosure.

In one embodiment, the terminal determining each of the second edge nodes according to each transmission rate of each of the first edge nodes further includes the following operations. For any first edge node of the first edge nodes, the terminal determines a second amount of the target resource returned by the first edge node according to a transmission rate of the first edge node in a latest resource return period, determines N first edge nodes from the first edge nodes, and takes the N first edge nodes as the second edge nodes. A total amount of the target resource of each second amount returned by each of the N first edge nodes is configured to achieve that the total amount of the target resource cached by the terminal meets the second setting condition.

For example, after the terminal determines the data amount of the resource able to be returned by the edge node 1, the edge node 2, the edge node 3, the edge node 4, and the edge node 5 in the next resource return period respectively in the above examples, for a first resource return period after the current resource return period (i.e., a next resource return period of the current resource return period), the terminal determines the transmission duration that each of the first edge nodes needs to consume when returning the resource of the data amount that is able to be transmitted by each of the first edge nodes based on the transmission rate of each of the first edge nodes.

The terminal determines, through calculation, at least how many edge nodes need to be used to provide resource download service for the terminal in the next resource return period, and enables the total amount of the resource returned by the determined edge nodes to achieve that the total amount of the resource locally cached by the terminal meets the second setting condition. The second setting condition may be determined by a person skilled in the art based on data of the user. Referring to the description of the first setting condition, in this embodiment of the present disclosure, the second setting condition may be represented by a sliding window in units of time (e.g., in units of 's'), or may be represented by a sliding window in units of the data amount of the resource (e.g., in units of 'bit'), which is not specifically limited in the present disclosure. The second setting condition is configured to indicate the highest requirement for cache play. For example, the second setting condition in the embodiment of the present disclosure may be interpreted as controlling the terminal to locally cache a resource of a set duration/a set total amount (the set duration/the set total amount slides based on time), so that waste of network resource and terminal memory resource is in an acceptable range, which is caused when the user's demand for smooth play of the video resource is met and caused by a sudden situation in which the user selects to stop watching the video resource in the middle of the playing. In the embodiments of the present disclosure, the first setting condition is named as c2.

In one embodiment, the number of the first edge nodes is M, and the terminal determining the N first edge nodes from the first edge nodes further includes the following operations. The terminal sorts transmission rates of M first edge nodes in descending order. In response to determining that a total amount of the target resource of each second amount returned by each of first N first edge nodes is configured to achieve that the total amount of the target resource cached by the terminal meets the second setting condition, and that a total amount of the target resource of each second amount returned by each of first N−1 first edge nodes is unable to be configured to achieve that the total amount of the target resource cached by the terminal meets the second setting condition, the terminal takes the N first edge nodes as the second edge nodes.

Following the above examples in which the terminal determines at least how many edge nodes are required to enable the total amount of the resource returned by the edge nodes to be used to achieve that the total amount of the resource cached by the terminal meets the second setting condition, the terminal sorts the first edge nodes (the edge node 1, the edge node 2, the edge node 3, the edge node 4, and the edge node 5 (five first edge nodes in total)) in a descending order of the transmission rate. Then, a first edge node with the highest transmission rate is taken as a starting point of calculation to calculate the first few of the five first edge nodes with the transmission rate from high to low required to be used in the next resource return period, see the following calculation formula:

$$\frac{n_1 * a * 8}{s_1} + \frac{n_2 * a * 8}{s_2} + \ldots + \frac{n_i * a * 8}{s_i} <= c_2,$$

where $n_i$ denotes a number of resource slices returned by a $i^{th}$ first edge node in the sorted first edge nodes in the next resource return period, $s_i$ denotes a transmission rate (in units of Kbps in the embodiments of the present disclosure) of the $i^{th}$ first edge node in the sorted first edge nodes, a denotes a data amount of each resource slice (in units of byte in the embodiments of the present disclosure), $c_2$ denotes the second setting condition (in units of s in the embodiments of the present disclosure), and the number 8 denotes a conversion coefficient (between bit and Byte). In the embodiments of the present disclosure, since five first edge nodes are provided, the maximum value of i is taken as 5.

In this way, in the next resource return period, several edge nodes with higher transmission rate instead of all the edge nodes are used to provide the service for the terminal. In addition, the data amount of the resource slices returned by each edge node providing the service to the terminal is determined according to the transmission rate of the edge node in the historical resource return period, and the number of the resource slices is relatively large if the transmission rate is large, so that the I/O resource consumption and memory occupation of each edge node providing the service are greatly reduced.

In one embodiment, after the terminal sends the second resource acquisition request for the target resource to each of the second edge nodes, the method further includes the following operations. In response to determining, based on each second amount of the target resource returned by each of the second edge nodes, that a total amount of the target resource cached by the terminal meets a second setting condition, the terminal stops sending the resource acquisition request to the edge nodes.

For example, the terminal determines, through calculation, that the total amount of the target resource of the second amount returned by each second edge node to the terminal is able to be configured to achieve that the terminal no longer sends the resource acquisition request to any edge node and to the CDN1 node when the total amount of the target resource locally cached by the terminal meets the second setting condition.

In 203, the terminal sends a second resource acquisition request for the target resource to each of the second edge nodes.

After the terminal determines the second edge nodes from the first edge nodes, the terminal may send the second resource acquisition request to the second edge nodes.

Based on this, in the video on demand scenario, the terminal sends the first resource acquisition request for the target resource to each of the first edge nodes, determines each of the second edge nodes based on each first amount of the target resource returned by each of the first edge nodes, and then sends the second resource acquisition request for the target resource to each of the second edge nodes such that the terminal does not need to send the resource acquisition request to each of the first edge nodes again. In this way, the number of the first edge nodes used by the terminal is effectively reduced. Moreover, the terminal is able to request data centrally from some high-quality edge nodes, and each of the high-quality edge nodes returns a large amount of the target resource to the terminal, which avoids continuing to request data from some edge nodes not serving well, thereby overcoming the technical problem that edge nodes are easily prone to bottlenecks in I/O performance, and improving data pre-reading performance of the edge nodes.

In some embodiments of the present disclosure, after the terminal sends the second resource acquisition request for the target resource to each of the second edge nodes, the method further includes the following operation. The terminal sends a fifth resource acquisition request to the CDN node after determining that the total amount of the target resource cached by the terminal does not meet the first setting condition.

For example, at time T2, the terminal determines that the current total amount of the resource has been locally cached does not meet the first setting condition, that is, the current total amount of the resource cached by the terminal does not meet the requirement for the smooth play. In this case, in order to supplement the current resource locally cached by the terminal as soon as possible, the terminal sends the fifth resource acquisition request to the CDN1 node, so that the current total amount of the resource locally cached by the terminal is able to meet the requirement for the smooth play again based on the video resource of the fifth amount returned by the CDN1 node to the terminal.

In some embodiments of the present disclosure, the terminal establishes a heartbeat mechanism with at least one third edge node. The heartbeat mechanism is configured for the terminal to determine a service state of each of the at least one third edge node, and the least one third edge node is at least one edge node other than the second edge nodes among the first edge nodes.

In the above examples, if the terminal determines, through calculation, that the edge nodes whose transmission rates are from high to low are the edge node 1, the edge node 2, the edge node 3, the edge node 4 and the edge node 5 in order. The terminal finds by calculation that only the edge node 1, the edge node 2 and the edge node 3 need to be controlled to return the resource to themselves in the next resource return period such that the total amount of the resource locally cached is able to meet the second setting condition. Therefore, the edge node 1, the edge node 2 and the edge node 3 in the embodiments of the present disclosure are referred to as second edge nodes, and the edge node 4 and the edge node 5 are referred to as third edge nodes. Thus, the terminal establishes the heartbeat mechanism with the edge node 4 and the edge node 5, respectively, while the terminal sends the resource acquisition request to the edge node 1, the edge node 2, and the edge node 3, respectively. For example, the terminal sends a heartbeat message to the edge node 4 and the edge node 5 respectively, and then the edge node 4 and the edge node 5 respectively returns a heartbeat acknowledgement message to the terminal when receiving the heartbeat message, thereby ensuring that there is effective communication between the edge nodes 4, 5 and the terminal at all times.

In one embodiment, after the terminal sends the second resource acquisition request for the target resource to each of the second edge nodes, the method further includes the following operations. In response to determining that there is a second edge node in an unserviceable state, the terminal determines an edge node for replacing the second edge node in the unserviceable state according to each transmission rate of each of the at least one third edge node.

As the above examples, the terminal controls the edge node 1, the edge node 2 and the edge node 3 with relatively high transmission rates to return the video resource to the terminal, if the terminal does not receive the video resource returned by one or more of the second edge nodes within a preset duration (the preset duration may be slightly longer than the transmission duration in the new resource return period determined by the terminal for each of the second edge nodes, where the second edge nodes are different and respective preset durations corresponding to the second edge nodes change accordingly), e.g., the terminal does not receive the video resource returned by the edge node 3 within the preset duration corresponding to the edge node 3, it indicates that the edge node 3 (i.e., the second edge node) is in the unserviceable state. The terminal then determines, from the two third edge nodes (i.e., the edge node 4 and the edge node 5), an edge node that is able to be used to replace the edge node 3 in order to achieve that the total amount of the resource locally cached meets the second setting condition. Specifically, the replacement of the edge node 3 may be implemented in the following two modes.

Mode 1: the terminal may determine, from the edge node 4 and the edge node 5, an edge node that is able to be used to replace the edge node 3 by using the locally stored transmission rate of the two third edge nodes (i.e., the edge node 4 and the edge node 5) when the two third edge nodes provides the service for the terminal in the latest resource return period, including determining whether only the edge node 4 is used to provide the resource download service for the terminal, or both the edge node 4 and the edge node 5 need to be used to provide the resource download service for the terminal.

Mode 2: in order to avoid that the transmission rates of the two third edge nodes (i.e., the edge node 4 and edge node 5) change in the relatively idle time in which the two third edge nodes are not used, that is, the transmission rates originally determined and stored by the terminal when the two third edge nodes provide the service for the terminal in the latest resource return period is unable to be accurately used to indicate their transmission rates at the current time. Therefore, the terminal sends the resource acquisition request to edge node 4 and an edge node 5, respectively, to re-acquire their transmission rates at the current time. The data amount of resource required to be obtained in the resource acquisition request sent by the terminal to the edge node 4 and the edge node 5 respectively may be the same or different, which is not specifically limited in the present disclosure.

It should be noted that the method for requesting resources in this embodiment of the present disclosure is able to be applied to all devices having a play function, and is not limited to a PC or a mobile terminal. Specifically, a data downloading module may be embedded into a player of the mobile terminal by encapsulating the data downloading module into a software development kit (SDK). Therefore, when the mobile terminal receives a resource play instruction triggered by the user, more specifically, the player in the mobile terminal receives the resource play instruction, the player transmits a resource identifier of the video resource indicated by the resource play instruction to the data downloading module by invoking a corresponding interface of the SDK corresponding to the data downloading module, then the data downloading module starts data downloading, and sends the downloaded data to the player for playing by the player.

Figure 3:
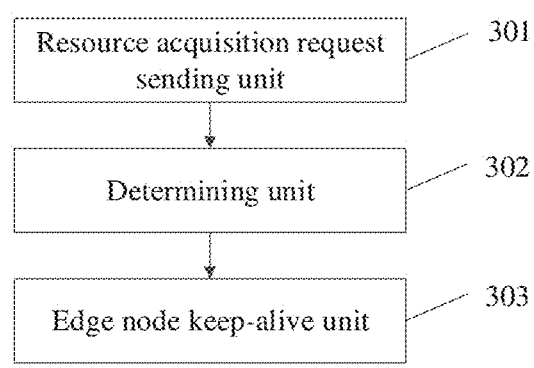
FIG. 3 illustrates a terminal in accordance with some embodiments of the present disclosure.

Based on the same concept, the embodiments of the present disclosure further provide a terminal. As shown in FIG. 3, the terminal includes a resource acquisition request sending unit 301, configured to send a first resource acquisition request for a target resource to each of first edge nodes; and a determining unit 302, configured to determine each of second edge nodes based on each first amount of the target resource returned by each of the first edge nodes. The resource acquisition request sending unit 301 is further configured to send a second resource acquisition request for the target resource to each of the second edge nodes.

For the terminal, the determining unit 302 is further configured to for any first edge node of the first edge nodes, determine a transmission rate of the first edge node according to a first amount of the target resource returned by the first edge node; and in response to determining that a total amount of the target resource cached by the terminal meets a first setting condition, determine each of the second edge nodes according to each transmission rate of each of the first edge nodes.

For the terminal, the resource acquisition request sending unit 301 is further configured to stop sending the resource acquisition request to the edge node in response to determining, based on each second amount of the target resource returned by each of the second edge nodes, that a total amount of the target resource cached by the terminal meets a second setting condition.

For the terminal, the resource acquisition request sending unit 301 is further configured to: receive a resource play instruction triggered by a user, wherein the resource play instruction is configured to instruct the terminal to play the target resource; send a third resource acquisition request for the target resource to a content delivery network, CDN, node; and receive the target resource of a third amount returned by the CDN node, wherein the third amount is configured to identify that the total amount of the target source cached by the terminal meets the first setting condition.

For the terminal, the resource acquisition request sending unit 301 is further configured to send a fourth resource acquisition request to each of edge nodes that store the target resource after determining that the total amount of the target resource cached by the terminal meets the first setting condition. The fourth resource acquisition request is configured to indicate that each of the edge nodes returns the target source of the same fourth amount to the terminal.

For the terminal, the determining unit 302 is further configured to determine each of the second edge nodes and each second amount of the target resource returned by each of the second edge nodes based on each first amount of the target resource returned by each of the first edge nodes, wherein each second amount of the target resource returned by each of the second edge nodes is not completely the same.

The terminal further includes an edge node keep-alive unit 303 configured to establish a heartbeat mechanism with at least one third edge node. The heartbeat mechanism is configured for the terminal to determine a service state of each of the at least one third edge node, and the least one third edge node is at least one edge node other than the second edge nodes among the first edge nodes.

For the terminal, the resource acquisition request sending unit 301 is further configured to: in response to determining that there is a second edge node in an unserviceable state, determine an edge node for replacing the second edge node in the unserviceable state according to each transmission rate of each of the at least one third edge node.

For the terminal, the determining unit 302 is further configured to: for any first edge node of the first edge nodes, determine a second amount of the target resource returned by the first edge node according to a transmission rate of the first edge node in a latest resource return period; determine N first edge nodes from the first edge nodes; and take the N first edge nodes as the second edge nodes. A total amount of the target resource of each second amount returned by each of the N first edge nodes is configured to achieve that the total amount of the target resource cached by the terminal meets the second setting condition.

For the terminal, a number of the first edge nodes is M, and the determining unit 302 is further configured to: sort transmission rates of M first edge nodes in descending order; and in response to determining that a total amount of the target resource of each second amount returned by each of first N first edge nodes is configured to achieve that the total amount of the target resource cached by the terminal meets the second setting condition, and that a total amount of the target resource of each second amount returned by each of first N−1 first edge nodes is unable to be configured to achieve that the total amount of the target resource cached by the terminal meets the second setting condition, take the N first edge nodes as the second edge nodes.

Embodiments of the present disclosure provide a computing device, which may be a desktop computer, a portable computer, a smartphone, a tablet computer, a personal digital assistant (PDA), or the like. The computing device may include a central processing unit (CPU), a memory, an input/output device, and the like. The input device may include a keyboard, a mouse, a touch screen, and the like, and the output device may include a display device such as a liquid crystal display (LCD), a cathode ray tube (CRT), and the like.

A memory, which may include a read only memory (ROM) and a random access memory (RAM), and provide program instructions and data stored in the memory to at least one processor. In some embodiments of the present disclosure, the memory is configured to store program instructions of the method for requesting resources, and the at least one processor is configured to invoke program instructions stored in the memory to execute the method for requesting resources according to the program instructions.

Embodiments of the present disclosure provide a computer readable storage medium storing computer executable instructions that, when executed by a computer, cause the computer to perform the method for requesting resources.

Those skilled in the art should appreciate that embodiments of the present disclosure may be provided as methods, or computer program products. Accordingly, the present disclosure may take the form of entirely hardware embodiments, entirely software embodiments, or embodiments combining software and hardware aspects. Moreover, the present disclosure may take the form of a computer program product implemented on one or more computer readable storage media (including, but not limited to, a magnetic disk memory, a compact disc read-only memory (CD-ROM), an optical memory, etc.) in which computer readable program code is contained.

The present disclosure is described with reference to flowcharts and/or block diagrams of methods, devices (systems), and computer program products according to the present disclosure. It should be understood that each flow and/or block in the flowcharts and/or block diagrams and the combination of the flow and/or block in the flowcharts and/or block diagrams may be implemented by computer program instructions. These computer program instructions may be provided to processors of a general-purpose computer, a dedicated computer, an embedded processor, or other programmable data processing devices to generate a machine such that instructions executed by the processors of the computer or other programmable data processing devices generate apparatus for implementing the functions specified in one or more flows of the flowcharts and/or one or more blocks of the block diagrams.

These computer program instructions may also be stored in a computer readable memory capable of directing a computer or other programmable data processing devices to operate in a particular manner such that instructions stored in the computer readable memory produce manufactures including instruction apparatus, and the instruction apparatus implements functions specified in one or more flows of the flowcharts and/or in one or more blocks of the block diagrams.

These computer program instructions may also be loaded onto a computer or other programmable data processing devices such that a series of operations are performed on the computer or other programmable devices to generate computer-implemented processing, such that the instructions executed on the computer or other programmable devices provide operations for implementing the functions specified in one or more flows of the flowcharts and/or in one or more blocks of the block diagrams.

Although only the above embodiments of the present disclosure have been described herein, additional changes and modifications may be made to these embodiments by those skilled in the art once the basic inventive concept is known. Therefore, the appended claims are intended to be interpreted as including the above embodiments and all changes and modifications falling within the scope of the present disclosure.

It is apparent that those skilled in the art may make various modifications and variations to the present disclosure without departing from the spirit and scope of the present disclosure. Thus, if these modifications and variants of the present disclosure fall within the scope of the claims and their equivalents, the present disclosure is also intended to include these modifications and variants.

What is claimed is:

1. A method for requesting resources, applied at a terminal, comprising:
sending a first resource acquisition request for a target resource to each of first edge nodes;
determining each of second edge nodes based on each first amount of the target resource returned by each of the first edge nodes, wherein the second edge nodes are included in the first edge nodes; and
sending a second resource acquisition request for the target resource to each of the second edge nodes;
wherein determining each of the second edge nodes based on each first amount of the target resource returned by each of the first edge nodes comprises:
determining each of the second edge nodes and each second amount of the target resource returned by each of the second edge nodes based on each first amount of the target resource returned by each of the first edge nodes, wherein each second amount of the target resource returned by each of the second edge nodes is not completely the same; and
the method further comprises:
establishing a heartbeat mechanism with at least one third edge node, wherein the heartbeat mechanism is configured for the terminal to determine a service state of each of the at least one third edge node, and the least one third edge node is at least one edge node other than the second edge nodes among the first edge nodes.

2. The method according to claim 1, wherein determining each of the second edge nodes based on each first amount of the target resource returned by each of the first edge nodes comprises:
for any first edge node of the first edge nodes, determining a transmission rate of the first edge node according to a first amount of the target resource returned by the first edge node; and
in response to determining that a total amount of the target resource cached by the terminal meets a first setting condition, determining each of the second edge nodes according to each transmission rate of each of the first edge nodes.

3. The method according to claim 1, wherein after sending the second resource acquisition request for the target resource to each of the second edge nodes, the method further comprises:
in response to determining, based on each second amount of the target resource returned by each of the second edge nodes, that a total amount of the target resource cached by the terminal meets a second setting condition, stopping sending a resource acquisition request to any edge node.

4. The method according to claim 1, wherein before sending the first resource acquisition request for the target resource to each of the first edge nodes, the method further comprises:
receiving a resource play instruction triggered by a user, wherein the resource play instruction is configured to instruct the terminal to play the target resource;
sending a third resource acquisition request for the target resource to a content delivery network, CDN, node; and
receiving the target resource of a third amount returned by the CDN node, wherein the third amount is configured to identify that the total amount of the target source cached by the terminal meets the first setting condition.

5. The method according to claim 4, wherein after sending the third resource acquisition request for the target resource to the CDN node, the method further comprises:
sending a fourth resource acquisition request to each of edge nodes that store the target resource after determining that the total amount of the target resource cached by the terminal meets the first setting condition, wherein the fourth resource acquisition request is configured to instruct each of the edge nodes to return the target source of the same fourth amount to the terminal.

6. The method according to claim 1, wherein after sending the second resource acquisition request for the target resource to each of the second edge nodes, the method further comprises:
in response to determining that there is a second edge node in an unserviceable state, determining an edge node for replacing the second edge node in the unserviceable state according to each transmission rate of each of the at least one third edge node.

7. The method according to claim 2, wherein determining each of the second edge nodes according to each transmission rate of each of the first edge nodes comprises:
for any first edge node of the first edge nodes, determining a second amount of the target resource returned by the first edge node according to a transmission rate of the first edge node in a most recent resource return period;
determining N first edge nodes from the first edge nodes, wherein a total amount of the target resource of each second amount returned by each of the N first edge nodes is configured to achieve that the total amount of the target resource cached by the terminal meets the second setting condition; and
taking the N first edge nodes as the second edge nodes, wherein N is a positive integer greater than 1.

8. The method according to claim 7, wherein a number of the first edge nodes is M, and determining the N first edge nodes from the first edge nodes comprises:
sorting transmission rates of M first edge nodes in descending order, wherein M is a positive integer greater than N; and
in response to determining that a total amount of the target resource of each second amount returned by each of first N first edge nodes is configured to achieve that the total amount of the target resource cached by the terminal meets the second setting condition, and that a total amount of the target resource of each second amount returned by each of first N−1 first edge nodes is unable to be configured to achieve that the total amount of the target resource cached by the terminal meets the second setting condition, taking the N first edge nodes as the second edge nodes.

9. A computer device, comprising:
a memory configured to store computer programs; and
at least one processor configured to invoke the computer programs stored in the memory to execute a method for requesting resources; wherein the method comprises:
sending a first resource acquisition request for a target resource to each of first edge nodes;
determining each of second edge nodes based on each first amount of the target resource returned by each of the first edge nodes, wherein the second edge nodes are included in the first edge nodes; and
sending a second resource acquisition request for the target resource to each of the second edge nodes;
wherein determining each of the second edge nodes based on each first amount of the target resource returned by each of the first edge nodes comprises:
determining each of the second edge nodes and each second amount of the target resource returned by each of the second edge nodes based on each first amount of the target resource returned by each of the first edge nodes, wherein each second amount of the target resource returned by each of the second edge nodes is not completely the same; and
the method further comprises:
establishing a heartbeat mechanism with at least one third edge node, wherein the heartbeat mechanism is configured for the terminal to determine a service state of each of the at least one third edge node, and the least one third edge node is at least one edge node other than the second edge nodes among the first edge nodes.

10. The computer device according to claim 9, wherein determining each of the second edge nodes based on each first amount of the target resource returned by each of the first edge nodes comprises:
for any first edge node of the first edge nodes, determining a transmission rate of the first edge node according to a first amount of the target resource returned by the first edge node; and
in response to determining that a total amount of the target resource cached by the terminal meets a first setting condition, determining each of the second edge nodes according to each transmission rate of each of the first edge nodes.

11. The computer device according to claim 9, wherein after sending the second resource acquisition request for the target resource to each of the second edge nodes, the method further comprises:
in response to determining, based on each second amount of the target resource returned by each of the second edge nodes, that a total amount of the target resource cached by the terminal meets a second setting condition, stopping sending a resource acquisition request to any edge node.

12. The computer device according to claim 9, wherein before sending the first resource acquisition request for the target resource to each of the first edge nodes, the method further comprises:
receiving a resource play instruction triggered by a user, wherein the resource play instruction is configured to instruct the terminal to play the target resource;
sending a third resource acquisition request for the target resource to a content delivery network, CDN, node; and
receiving the target resource of a third amount returned by the CDN node, wherein the third amount is configured to identify that the total amount of the target source cached by the terminal meets the first setting condition.

13. The computer device according to claim 12, wherein after sending the third resource acquisition request for the target resource to the CDN node, the method further comprises:

sending a fourth resource acquisition request to each of edge nodes that store the target resource after determining that the total amount of the target resource cached by the terminal meets the first setting condition, wherein the fourth resource acquisition request is configured to instruct each of the edge nodes to return the target source of the same fourth amount to the terminal.

14. The computer device according to claim 9, wherein after sending the second resource acquisition request for the target resource to each of the second edge nodes, the method further comprises:

in response to determining that there is a second edge node in an unserviceable state, determining an edge node for replacing the second edge node in the unserviceable state according to each transmission rate of each of the at least one third edge node.

15. The computer device according to claim 10, wherein determining each of the second edge nodes according to each transmission rate of each of the first edge nodes comprises:

for any first edge node of the first edge nodes, determining a second amount of the target resource returned by the first edge node according to a transmission rate of the first edge node in a most recent resource return period;

determining N first edge nodes from the first edge nodes, wherein a total amount of the target resource of each second amount returned by each of the N first edge nodes is configured to achieve that the total amount of the target resource cached by the terminal meets the second setting condition; and taking the N first edge nodes as the second edge nodes, wherein N is a positive integer greater than 1.

16. A non-transitory computer readable storage medium storing a program that, when executed on a computer, causes the computer to perform a method for requesting resources; wherein the method comprises:

sending a first resource acquisition request for a target resource to each of first edge nodes;

determining each of second edge nodes based on each first amount of the target resource returned by each of the first edge nodes, wherein the second edge nodes are included in the first edge nodes; and sending a second resource acquisition request for the target resource to each of the second edge nodes;

wherein determining each of the second edge nodes based on each first amount of the target resource returned by each of the first edge nodes comprises:

determining each of the second edge nodes and each second amount of the target resource returned by each of the second edge nodes based on each first amount of the target resource returned by each of the first edge nodes, wherein each second amount of the target resource returned by each of the second edge nodes is not completely the same; and the method further comprises:

establishing a heartbeat mechanism with at least one third edge node, wherein the heartbeat mechanism is configured for the terminal to determine a service state of each of the at least one third edge node, and the least one third edge node is at least one edge node other than the second edge nodes among the first edge nodes.

* * * * *